United States Patent [19]
Paquet

[11] Patent Number: 5,894,885
[45] Date of Patent: Apr. 20, 1999

[54] CONDENSER HAVING A SIMPLIFIED ASSEMBLY FOR USE IN AN AIR CONDITIONING CIRCUIT FOR A VEHICLE

[75] Inventor: André Paquet, Gueux, France

[73] Assignee: Valeo Thermique Moteur, La Verriere, France

[21] Appl. No.: 08/964,068

[22] Filed: Nov. 4, 1997

[30] Foreign Application Priority Data

Nov. 4, 1996 [FR] France .................................. 96 13408

[51] Int. Cl.$^6$ .................................. F28F 9/007; F28F 9/02
[52] U.S. Cl. .................. 165/134.1; 165/149; 165/906
[58] Field of Search .......................... 165/134.1, 149, 165/906, 174

[56] References Cited

U.S. PATENT DOCUMENTS 1,696,995  1/1929  Young .
1,759,167  5/1930  Modine .
5,014,771  5/1991  Lederer .
5,265,672  11/1993  Aoki ........................................ 165/149

FOREIGN PATENT DOCUMENTS 0 061 873  6/1982  European Pat. Off. .
0 255 313  3/1988  European Pat. Off. .
4-288490  10/1992  Japan ..................................... 165/174
5-248783  9/1993  Japan ..................................... 165/149

OTHER PUBLICATIONS

French Search Report dated Jul. 7, 1997.

*Primary Examiner*—Allen Flanigan
*Attorney, Agent, or Firm*—Morgan & Finnegan, L.L.P.

[57] ABSTRACT

A heat exchanger comprises a condenser in which the lateral cheeks serving for the attachment of the condenser are replaced by the end tubes of the array, which open into the collectors beyond end partitions therein so as to be separated from the circulation of the liquid coolant. In this way, the particular parts formed by the cheeks and the positioning operation thereof are omitted.

12 Claims, 1 Drawing Sheet

CONDENSER HAVING A SIMPLIFIED ASSEMBLY FOR USE IN AN AIR CONDITIONING CIRCUIT FOR A VEHICLE

BACKGROUND OF THE INVENTION

The invention relates to a heat exchanger, and more particularly to a condenser for an air conditioning device for the passenger space of a vehicle, comprising two collectors extending in the same direction and an array of tubes which are parallel to one another and mutually aligned in the direction, the ends of the tubes penetrating respectively into the collectors through openings provided in the wall thereof so as to establish a communication for a liquid coolant between the two collectors by means of the tubes.

The condensers thus formed are usually supplemented by two elongated components forming side shields, disposed respectively opposite the two ends of the row of tubes and mechanically attached to the ends of the two collectors, for example by soldering, so as to form therewith a rigid structure. These side shields serve to bear attachment lugs for the mechanical attachment of the condenser to other components, in particular to the structure of the vehicle or to another heat exchanger, such as the cooling radiator of the engine, itself fixed to the structure of the vehicle. The side shields may also serve for the mechanical protection of the bank of tubes, and more particularly of the inserts which are interposed, firstly between the tubes of the row, and secondly between each end tube and the corresponding side shields, to reinforce the exchange of heat between the tubes through which the liquid coolant flows in heat exchange relationship a flow of air passing through the array.

The object of the invention is to simplify the structure and the assembly of the condenser.

SUMMARY OF THE INVENTION

The invention more particularly relates to a heat exchanger of the kind defined in the introduction, and requires that the end tube located at least at one end of the row, and preferably each of the two end tubes, is screened from the circulation of fluid so as to form a side shields able to serve for the lateral protection of the bank and/or the mechanical connection between the exchanger and other components.

The assembly of the exchanger is therefore reduced to fitting together, usually by soldering, the collectors and the array, in which all the tubes are roughly identical and cooperate in the same manner with the collectors, thus excluding the side shields of the prior art which are parts of a particular shape, cooperating with the collectors differently from the tubes.

Optional characteristics of the invention, whether complementary or alternative, are as follows. Each collector may comprise a tubular wall and at least two partitions extending at right angles to the interior thereof to delimit there at least one chamber for the fluid, among which one end partition is disposed on the other side of the end tube in relation to the corresponding end of the collector, so that said tube opens inside the tubular wall outside the chamber or chambers.

The said end partition may be placed between the end of the end tube and that of the tube adjacent thereto in the row, so that these two tubes open inside the tubular wall outside the chamber or chambers and into a chamber respectively.

The end tube is preferably sealed at its two ends so that the fluid cannot enter there.

The bank may also comprise inserts aligned alternately with the tubes and capable of maintaining the mutual spacing thereof and/or of reinforcing the exchange of heat between the tubes and a flow of air passing through the array.

DETAILED DESCRIPTION OF THE DRAWINGS

The characteristics and advantages of the invention will be explained in more detail in the following description, with reference to the attached drawings, in which.

DETAILED DESCRIPTION OF THE PREFERRED EMBODIMENT

Figure 2:
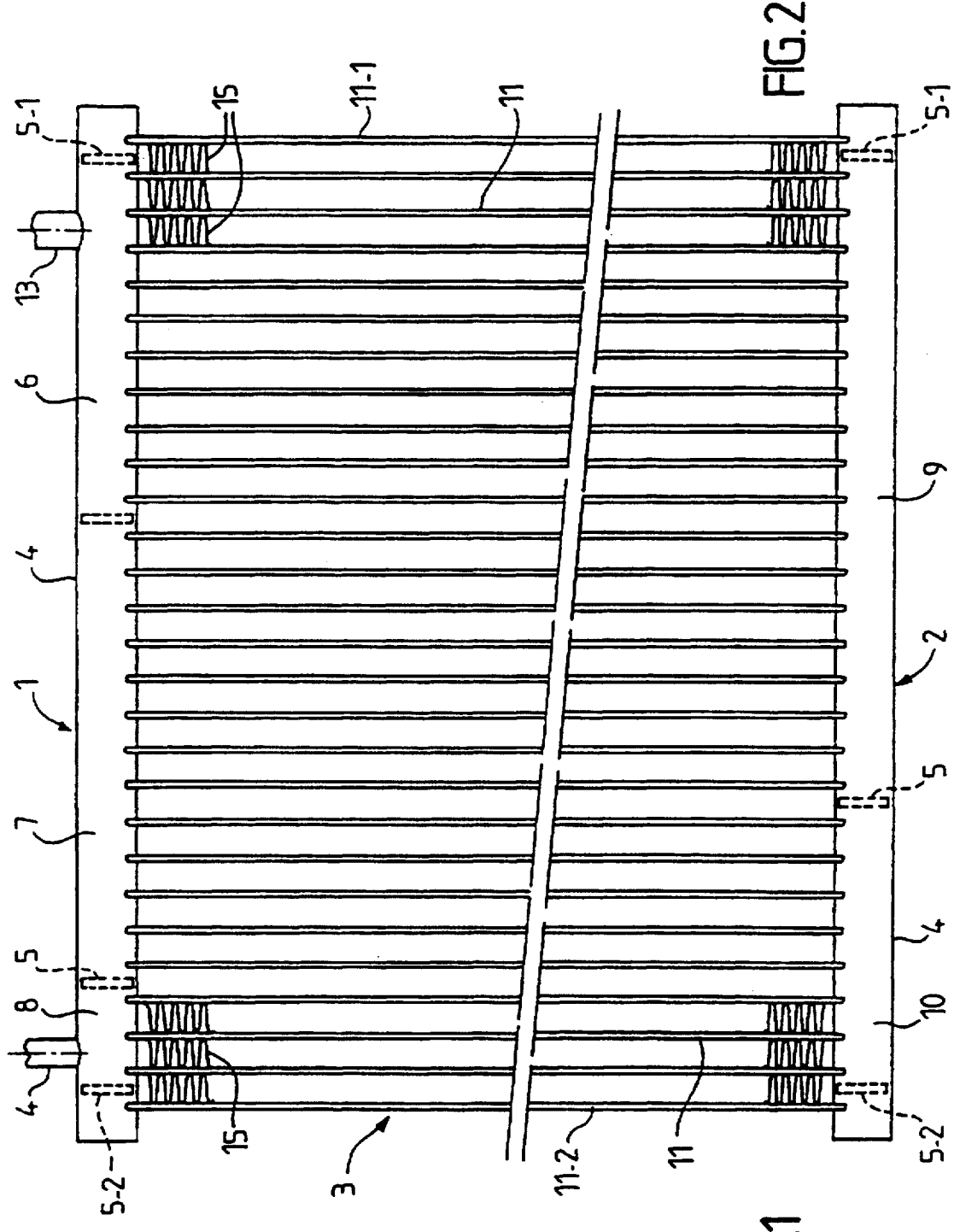
FIG. 2 is a front view of this condenser.

The condenser illustrated, intended for the circulation of refrigerant in an air conditioning device for the passenger space of a motor vehicle, comprises two collectors, an upper collector 1 and a lower collector 2, between which an array or bank of tubes 3 is located. The terms "upper" and "lower" refer to the orientation of the condenser as represented in the drawings. Nevertheless, it is understood that the condenser may operate in a different orientation. The collectors 1 and 2 are disposed one above the other, their axes being horizontal and parallel to one another, and each comprise a tubular wall 4 having a circular section, and partitions 5 extending at right angles inside the tubular wall to delimit there chambers capable of receiving the refrigerant during circulation, i.e. three chambers 6, 7 and 8 for the upper collector 1 and two chambers 9 and 10 for the lower collector 2, from the right to the left in FIG. 2.

Figure 1:
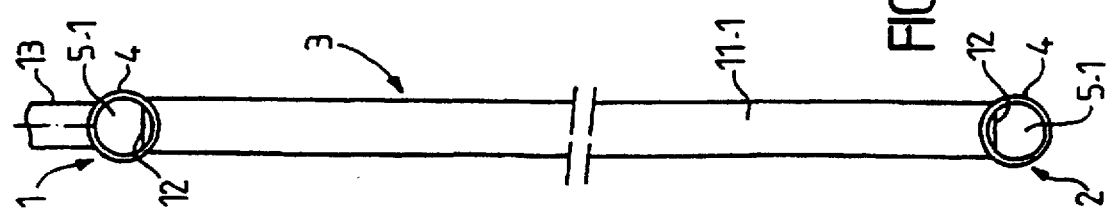
FIG. 1 is an end view of a condenser according to the invention.

The array 3 comprises a plurality of identical tubes 11 extending vertically and having a flattened shape, i.e. an elongated cross section from the left to the right of FIG. 1. The tubes are aligned with one another and uniformly spaced from the left towards the right of FIG. 2. Each of the tubes has upper and lower ends respectively which penetrate into the collectors 1 and 2, through appropriate apertures provided in the tubular walls 4.

The tubular walls 4, the partitions 5 and the tubes 11 are metallic and are fitted tightly together, by fusing a soldering material applied beforehand by coating on at least certain parts of these pieces.

All the tubes 11 comprise partial assemblies connecting chambers 6 and 9, chambers 9 and 7, chambers 7 and 10 and chambers 10 and 8. The fluid, which enters the condenser through an inlet fitting 13 which opens into chamber 6, therefore successively passes through chambers 6, 9, 7, 10 and 8, each time passing from one to the other through the tubes of one of the above-mentioned partial assemblies, to come out again through an outlet fitting 14 which communicates with chamber 8. Whilst circulating in the tubes, the fluid yields heat to a flow of air which passes through the array. The exchange of heat is reinforced by inserts 15 filling the spaces between the tubes and in thermal contact therewith. These inserts are strips of sheet metal curved in the form of a sinusoid, the crests of the sinusoid coming into contact alternately with one large face of the two tubes adjacent to the insert.

According to the invention, the right-hand end partitions 5-1 of the two collectors are disposed to the left of the end tube 11-1 of the array and the left-hand end partitions 5-2 are disposed to the right of the end tube 11-2. More precisely, each end partition is placed between an end tube and the tube adjacent thereto. As a result the end tubes open into the interior of the tubular walls of the collectors but outside the chambers in which the fluid circulates. These end tubes are therefore screened from the circulation of the fluid and may perform the functions of the conventional "cheeks" as recalled above.

As a refinement, the invention my require that the end tubes open, as usual, into the end chambers of the collectors, and that the ends of the end tubes are sealed to prevent the fluid entering there. The ends of the tubes may be sealed either by crushing them, or by filling them with a sealing material.

I claim:

1. A heat exchanger comprising two collectors positioned parallel to each other and extending in a first direction, each collector including a wall and a plurality of openings provided in said wall and an array comprising a plurality of rows of tubes including two end tubes, each tube being parallel to one another and including two ends, wherein each of the two ends of the tubes penetrates each of the openings of each collector to establish a communication for a liquid coolant, wherein one of the end tubes is blocked from the circulation of fluid to form side shields for the lateral protection of the array and for the mechanical connection of the exchanger to other components of the vehicle, and maintaining a flow of air passing through the array.

2. A heat exchanger according to claim 1, wherein the wall of each collector includes an interior and at least two partitions extending at right angles to the interior to delimit at least one chamber, wherein a portion of the end tube in relation to the corresponding is positioned between an end partition and an end of the collector such that the end tube opens inside the wall at a position outside the chamber.

3. A heat exchanger according to claim 2, wherein the end partition is located between the portion of the end tub and a portion of a tube adjacent to the end tube, wherein the end tube and the adjacent tube open into at least one chamber.

4. A heat exchanger according to claim 1, wherein the end tube is sealed at its two ends.

5. A heat exchanger according to claim 1, wherein the array further comprises inserts aligned alternately with the tubes for maintaining the mutual spacing between the tubes, reinforcing the exchange of heat between the tubes and maintaining a flow of air passing through the array.

6. A heat exchanger according to claim 1, wherein the two end tubes are blocked from the circulation of fluid to form side shields.

7. Method for passing fluid through a heat exchanger of a vehicle including two collectors positioned parallel to each other, each collector including a wall, a plurality of openings provided in said wall and an array of rows of tubes including two end tubes, the method comprising the steps of:

penetrating each of the two end tubes into each of the openings of each collector;

passing fluid between the two collectors via the tubes; and selectively blocking the circulation of fluid to one of the end tubes such that the end tube provides lateral protection of the array and a mount for connection to other components of the vehicle.

8. A method according to claim 7, further including the steps of providing at least two partitions perpendicular to an interior of each collector to delimit at least one chamber; and positioning a portion of the end tube between an end partition and an end of the collector such that the end tube opens inside the wall at a position outside the chamber.

9. A method according to claim 8, further including the steps of positioning the end partition between the portion of the end tube and a portion of a tube adjacent to the end tube; and disposing an open end of the end tube and an open end of the adjacent tube into at least one chamber.

10. A method according to claim 7, further including the step of sealing the end tube at its two ends.

11. The method according to claim 7, further including the steps of aligning inserts alternatively between the tubes of the array for maintaining the spacing between the tubes, reinforcing the heat exchange between the tubes and maintaining a flow of air passing through the array.

12. the method according to claim 7, further including the step of blocking the two end tubes from the circulation of the fluid.

* * * * *

UNITED STATES PATENT AND TRADEMARK OFFICE
CERTIFICATE OF CORRECTION

PATENT NO.: 5,894,885

DATED: April 26, 1999

INVENTOR(S): Andre Paquet

It is certified that errors appear in the above-identified patent and that said Letters Patent is hereby corrected as shown below:

In column 1, line 40, please delete "shields" and insert therefor -- shield --.

In claim 1, col. 3, lines 22-23, please delete ", and maintaining a flow of air passing through the array".

In claim 2, col. 3, lines 27-28, please delete "in relation to the corresponding".

In claim 3, col. 3, line 32, please delete "tub" and insert therefor -- tube --.

Signed and Sealed this

Fifth Day of October, 1999

*Attest:*

Q. TODD DICKINSON

*Attesting Officer*     *Acting Commissioner of Patents and Trademarks*